United States Patent [19]

Reese

[11] E Re. 29,876

[45] Reissued Jan. 2, 1979

[54] CONTAINER FOR TRANSPORTING RADIOACTIVE MATERIALS

[76] Inventor: Stanton L. Reese, 726 Laurel La., Lakeland, Fla. 33803

[21] Appl. No.: 820,228

[22] Filed: Jul. 29, 1977

Related U.S. Patent Documents

Reissue of:

[64] Patent No.: 3,727,059
Issued: Apr. 10, 1973
Appl. No.: 109,925
Filed: Jan. 26, 1971

[51] Int. Cl.[2] ..... G21F 5/00
[52] U.S. Cl. ..... 250/506
[58] Field of Search ..... 250/506, 507, 515, 518

[56] References Cited

U.S. PATENT DOCUMENTS

| | | | |
|---|---|---|---|
| 3,005,105 | 10/1961 | Losk | 250/108 R |
| 3,111,586 | 11/1963 | Rogers | 250/507 |
| 3,113,215 | 12/1963 | Allen | 250/506 |
| 3,391,280 | 7/1968 | Bonilla et al. | 250/506 |
| 3,483,381 | 12/1969 | Bonilla et al. | 250/506 |

*Primary Examiner*—Davis L. Willis
*Attorney, Agent, or Firm*—Fleit & Jacobson

[57] ABSTRACT

A container for transporting radioactive materials utilizing a removable system of heat conducting fins is provided which permits a substantial reduction in the weight of the container during transport, increases the heat dissipation capability of the container and substantially reduces the scrubbing operation after loading and unloading the radioactive material from the container. The detachable fins are made of a light weight highly heat conductive metal such as aluminum or aluminum alloys.

13 Claims, 3 Drawing Figures

Figure 1:
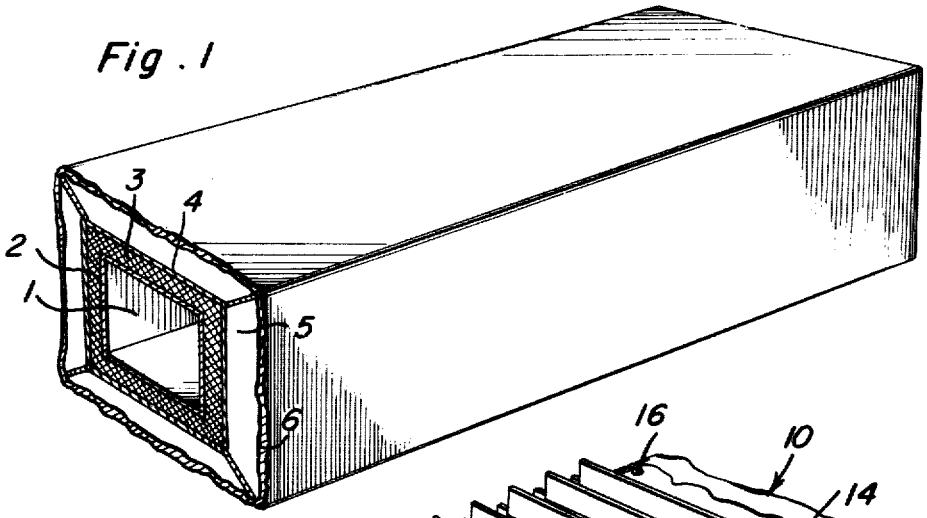

INVENTOR
Stanton L. Reese

BY Fleit, Gipple & Jacobson
ATTORNEY

CONTAINER FOR TRANSPORTING RADIOACTIVE MATERIALS

Matter enclosed in heavy brackets [ ] appears in the original patent but forms no part of this reissue specification; matter printed in italics indicates the additions made by reissue.

The present invention relates to an improved container or packaging assembly for transporting radioactive materials. More specifically, the present invention relates to a container or packaging assembly for transporting heat emitting radioactive materials which has improved heat dissipating features and which, by virute of its unique structure, has reduced weight.

Due to the radiation hazard associated with radioactive materials, it is generally necessary that these materials be packaged in sturdily constructed containers consisting of materials and design which will readily attenuate the radiation and dissipate the heat emitted by the radioactive material being transported. Radiation attenuation is necessary to biologically shield personnel and the public from radiation in the course of transport under both normal conditions of transport and under accident conditions. Heat dissipation is often necessary to protect the container from damage and to protect personnel from serious burns while carrying heat emitting radioactive materials.

In the past it has been the practice to construct heavy shipping containers for transporting highly radioactive heat emitting materials with a central cavity considerably larger than that necessary to obtain the radioactive materials to be transported. This void space is usually filled with a fluid, such as water, which circulates through the cavity to an external heat exchanger to provide cooling. This fluid also frequently serves to absorb neutrons. The cavity is normally lined with a corrosion resistant material, such as stainless steel, which is relatively resistant to decontaminating solutions. The material surrounding the liner is usually of high density because the ability to attenuate beta gamma radiation is proportional to the density of the shielding material.

The outer structure of the container normally includes an external wall surrounding the liner together with heat dissipating and impact fins integral with the wall. The outer surface including the external wall and fins are normally made of the same material, such as stainless steel or conventional steel coated with stainless steel. The fins serve to dissipate the heat emitted by the contained radioactive materials and protect the package against impact in the event of an accident. The surface of the outer structure is normally constructed of stainless stell or other acid resistant material in order to avoid reaction with corrosive decontaminating solutions, such as nitric acid.

Where highly radioactive materials are to be shipped, such as irradiated fuel elements or the waste resulting from the recovery of the fuel values found in irradiated fuel elements, the thick shielding and heat dissipating requirements for the walls and fins of the shipping container may result in a container which when loaded consists of as much as 98 percent shielding and heat dissipating structure and as little as 2 percent radioactive material payload to be transported. Unfortunately, containers of this type, while providing the necessary protection against emitted radiation, structural integrity, and heat dissipation, are so extremely heavy that the cost of transporting the radioactive material is extraordinarily high. Further, transport is often limited to one fuel assembly on a single legal weight road trailer at a time.

It is, accordingly, an object of the present invention to provide a container for transporting radioactive materials which has improved means for dissipating heat generated by the radioactive materials.

It is another object of the present invention to provide such a container for transporting radioactive materials which in addition to having an improved assembly for dissipating emitted heat is significantly lighter than previously known containers of this type.

Still another object of the present invention is to significantly lessen the time and materials required, compared to present practice, to remove road dirt and other contamination from the container proper after transport and to scrub or treat the container to remove radioactive contamination after loading and unolading operations.

In accordance with the present invention, these and other objects are achieved by providing a container for transporting radioactive materials in which the system of heat dissipating fins externally located on the container, having generally the configuration of heat dissipating fins employed in prior structures, is readily removable or detachable from the external wall of the container.

Numerous and unexpected advantages are realized by providing detachable cooling fins which are removable from the outer casing of the container rather than being an integral part thereof. By employing removable external fins in accordance with the present invention, it is possible to construct these fins of not only lighter materials, but materials which also have superior heat conducting properties, such as aluminum or aluminum alloys, rather than the heavier metals such as stainless steel. Stainless steel has heretofore been the preferred material for the fins in order that they will be resistant to corrosive cleansing solutions, such as nitric acid, with which the casing must be decontaminated. By providing detachable fins that are removable, they can be taken off the container prior to loading and unloading operations and thereby avoid the necessity of scrubbing or treating the fins with the decontaminating solutions. Thus, the fins may be constructed of materials which would not otherwise be non-corrosive to the decontaminating solution. Accordingly, the fins can be made of lighter, more heat conductive materials.

An additional advantage of the present invention is that due to the improved heat dissipation accomplished by using fins made of a substantially higher heat conducive material, it is not necessary to provide for a cooling liquid to circulate within the chamber. Thus, in addition to permitting a more simplified and therefore less costly device, the present invention also dispenses with the need for a central cavity which is substantially larger than the size of the radioactive materials to be contained therein. According to this invention, the central cavity into which the radioactive material is to be placed is substantially no larger than that necessary to accommodate the largest contemplated load of radioactive material since there is no requirement for a space through which to circulate a cooling fluid.

A further advantage of the present invention is that it permits easier cleaning. The container proper must be meticulously clean for loading and unloading of the radioactive material since this operation is performed visually under several feet of water which must be sparkling clear to permit observation of operations. Consequently, after detaching the heat dissipation system, the container proper requires only a minimum of cleaning time and materials in order to remove dirt, etc. picked up by the outer shell in transport before it can be loaded or unloaded. What cleaning is required is done to an essentially smooth, flat exterior wall surface instead of one containing the many crevices found in "premanently" finned structures. Similarly, decontaminating procedures are drastically simplified since it is no longer necessary to submerge the cooling fins into the contaminating water during loading and unloading operations. Hence, only the smooth, flat exterior wall surface of the container, and not the fin structure, need be scrubbed or treaded for decontamination.

Still another advantage of the heat dissipation system of the present invention is that the cooling fins may be designed for optimum heat transfer with little regard for strength because they can remain on the carrying vehicle and are thus protected from the handling injury they would be subjected to were they part of the container proper which must be moved around in the cleaning, unloading and loading processes. This design thus permits even lower weight in the heat dissipation system than would be practicable were the heat dissipation system permanently affixed to the container.

Still another advantage of the detachable fin system design of the present invention is that although the outer surface of the container proper may become contaminated with radioactivity from exposure to the loading or unloading area and this contamination may exceed the external surface limits for transport permitted by regulatory authority, the container may still be used since it is enveloped by the uncontaminated fin system, and the contaminatin is therefore not accessible on the outside surface of the package as presented for shipment.

For the purpose of illustrating the foregoing objects and advantages attendant this invention, preferred and illustrative embodiments of the invention will hereinafter be described with reference being had to the accompanying drawings forming a part hereof, wherein like numerals refer to like parts throughout, and in which:

FIG. 1 is a perspective view of the inner container having a smooth, flat exterior wall in which one end is broken away to show the interior sections of the container and with the heat conductive fins not shown.

Figure 2:
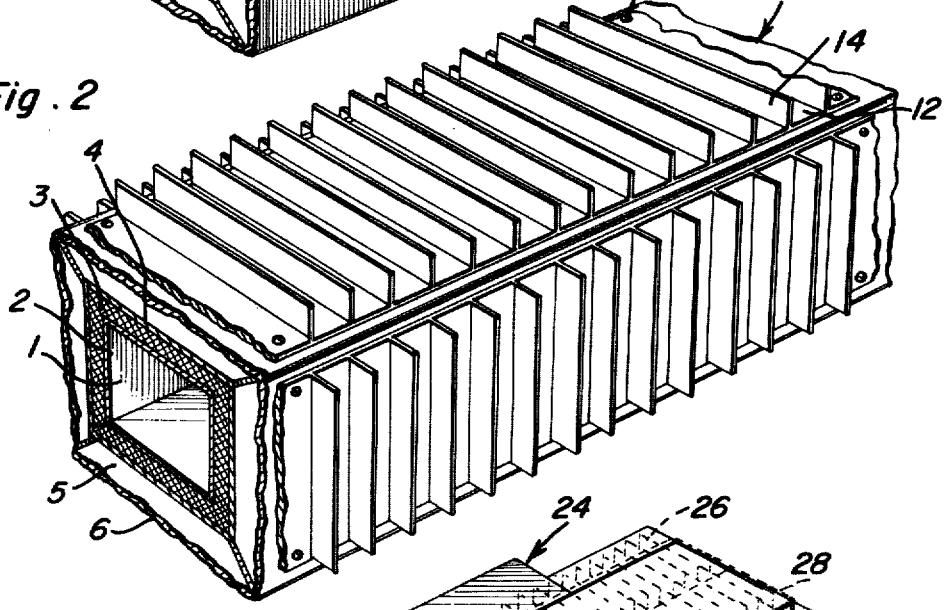
Figure 3:
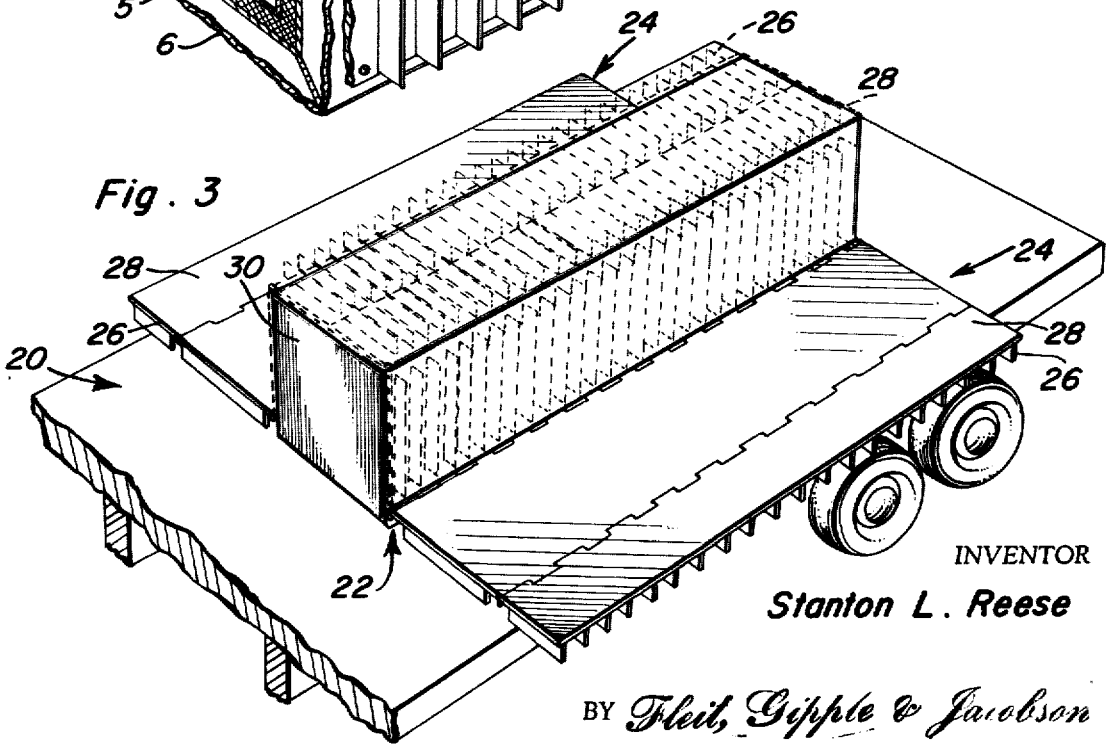

FIG. 2 is a perspective view of a portion of the smooth exterior wall container of FIG. 1 with the detachable fin system mounted thereon, the ends being broken away to also show the interior sections of the container; and FIG. 3 is a perspective view of another embodiment of the invention showing the smooth wall container positioned on a road trailer to be surrounded by the detachable fin system which is actually mounted on the road trailer, the fin system shown unassembled in solid lines and shown assembled in dashed lines.

Referring now specifically to FIGS. 1 and 2 of the drawings, the central cavity 1 carries the radioactive material. It is made only large enough for easy insertion of the fuel elements or other radioactive materials to be transported. While a square cross section is illustrated in the drawings, any configuration, such as round, may be employed, depending primarily on strength strength the shape of the material to be contained. The cavity is lined with a corrosion resistant inner liner 2, such as stainless steel. This inner liner is surrounded by a beta-gamma radiation shield 3 of sufficient thickness to be required for the beta-gamma shielding. However, since the size of the cavity is reduced from what had normally been required in prior structures, the volume of shielding material required is smaller to accomplish the same degree of shielding and, therefore, the total weight is thereby reduced without sacrificing radiation attenuation. Conventional beta-gamma radiation shielding materials can be used, however, metallic uranium depleted in the U-235 isotope is preferred. Further, depleted uranium having a structural strenght similar to that of steel is preferred so that the depleted uranium can be either cast or fabricated into the desired condiguration such that its structural strenght may be utilized to contribute to the overall integrity of the package.

The uranium shield is next surrounded with a structurally strong outer wall 4 which has an exterior surface of corrosion resistant material, such as stainless steel. An 18-8 stainless steel is often the preferred material.

If neutron attenuation is required by reason of the nature of the radioactive material being transported, an additional jacket 5 having an outer wall 6 is provided to accommodate a neutron attenuator, such as borated water (e.g. a dilute solution of a soluble boron compound such as sodium borate) or other low density fluid with suitable neutron attenuation properties. By this technique the lower density neutron absorbing material is at the outside of the package and thus adds relatively less weight to this large volume. A further advantage of this arrangement is that a reduced thickness of neutron absorbing fluid is required than would be required if the beta-gamma shield material were not between it and the neutron emitting radioactive material, the beta-gamma shielding being able to absorb some neutrons and slow some other neutrons. The outer wall 6 has a smooth exterior surface made of a material which also is corrosion resistant to decontaminating solutions, such as nitric acid.

Heat is dissipated through detachable fin plates 10, having the fins 12 permanently affixed to a base plate 14. The fin plates 10 are mounted against the smooth outer surface of wall 6 by bolts 16 or otherwise held in close heat conducting contact with the container surface, such as by springs or other conventional holding means. These fin plates 10 and heat dissipation fins 14 are removed during loading and unloading and, therefore, they need not be constructed of a material resistant to corrosion by decontaminating solutions. They may, preferably, be constructed of aluminum which has a thermal conductivity approximately 4 times that of steel and approximately 14 times that of stainless steel and a density about one-third that of steel or stainless steel. The resulting weight of the heat dissipation system may be approximately one-twelfth that of previously used stainless steel to obatin equal heat dissipation capability and a corresponding lower weight of stainless steel. A typical road trailer mounted container used to ship spent power reactor fuel elements, for example, might require 12,000 pounds of heat dissipating fins if they were composed of stainless steel. The same heat can be dissipated with approximately 1,000 pounds of aluminum fins or less.

It is to be understood, of course, that where the container of the present invention is to transport radioactive materials which do not necessitate neutron attenuation, the additional jacket 5 and outer wall 6 are an unnecessary part of the container. Under such circumstances, the jacket 5 and wall 6 are eliminated from the package, and the detachable fin plate 10 is mounted directly on outer wall 4 in the same manner as described for mounting the plate on wall 6.

Turning now to FIG. 3, it will be noted that a conventional tractor-trailer 20 has a trailer frame 22 on which are pivotally mounted at each side fin plates 24. Plates 24 include fins 26 permanently affixed to base plates 28 in the same manner as described for fin plates 10. Fin plates 24 are also transversely hinged at a point to allow these plates to surround a smooth exterior wall container 30 similar to that illustrated in FIG. 1. Accordingly, it can be seen that the detachable fin system of the present invention may be pivotally mounted on a conveyance and after placing the smooth wall container holding the radioactive material in position on the body, the detachable fins are then assembled around the container, as shown in dotted lines in FIG. 3, in heat conducting relation thereto.

It will be apparent to those skilled in the art that numerous modifications of the invention herein described and shown are possible without departing from the invention, which is to be interpreted in accordance with the appended claims.

It is claimed:

1. A container for transporting radioactive materials which comprises (a) a body having a beta gamma radiation absorbing material disposed between a central cavity for holding [radioactovem] *radioactive* material and an outer wall of [ocrrosion] *corrosion* resistant material, *said outer wall having an essentially smooth exterior surface,* and (b) heat dissipating fins detachably mounted on and extending outwardly from said outer wall in thermally conductive contact therewith, said heat dissipating fins having a lower density and a higher thermal conductivity than said corrosion resistant material.

2. The container of claim 1 wherein said cavity is of substantially the same dimensions as the radioactive material contained therein.

3. The container of claim 1 wherein said fins are made of aluminum or aluminum alloys.

4. The container of claim 1 where said beta gamma absorbing materail is depleted uranium and said corrosion resistant material is stainless steel.

5. The container of claim 1 which further comprises a jacket for holding a neutron attenuating substance, said jacket being disposed between the beta gamma absorbing material and the outer wall.

6. The container of claim 1 wherein said fins are vertically disposed on plates of the same metal as the fins, said plates being mounted in heat conductive relationship on [the skin of corrosion resistant metal] *said exterior surface of said outer wall.*

7. The container of claim 1 wherein said heat dissipating fins are less corrosion-resistant than said outer wall to decontamination solutions.

8. The container of claim 1 wherein said heat dissipating fins sufficiently envelop said outer wall to protect said wall from environmental contamination during transport.

9. In a container for transporting radioactive materials which includes a body of beta gamma absorbing material with a central cavity disposed therein for holding said material, an outer skin of corrosion-resistant metal surrounding said body, and heat dissipating fins in heat conductive relationship with said outer skin, the improvement which comprises *providing said outer skin with an essentially smooth exterior surface and* removably mounting said fins to said outer skin and constructing said fins from a lighter weight, greater heat conductive, less corrosion-resistance metal than said outer skin.

10. The container of claim 9 wherein said fins are made of aluminum or aluminum alloy.

11. The container of claim 9 wherein said fins are disposed on plates of the same metal as the fins, said plates being mounted in heat conductive relationship on [the] *said* skin of said corrosion resistant metal.

*12. A container for transporting radioactive materials which comprises (a) a body having a beta gamma radiation absorbing material disposed between a central cavity for holding radioactive material and an outer wall of corrosion resistant material having an essentially smooth exterior surface and (b) heat dissipating fins extending outwardly from said outer wall in thermally conductive contact therewith, said heat dissipating fins having a lower density and a higher thermal conductivity than said corrosion resistant material, said dissipating fins being mounted on a support of the same material as said fins which detachably abuts against said smooth exterior surface of said outer wall.*

*13. A container for transporting radioactive materials which comprises (a) a body having a beta gamma radiation absorbing material disposed between a central cavity for holding radioactive material and an outer wall of corrosion resistant material having an essentially smooth exterior surface and (b) heat dissipating fins extending outwardly from flat support members in intimate physical and thermal conductive contact with said smooth exterior surface, said heat dissipating fins and said support members having a lower density and a higher thermal conductivity than said corrosion resistant material and said heat dissipating fins and support members substantially enveloping said outer wall.*

* * * * *